United States Patent
Kikuchi et al.

(10) Patent No.: US 11,138,998 B2
(45) Date of Patent: Oct. 5, 2021

(54) MAGNETIC RECORDING MEDIUM, MAGNETIC RECORDING AND REPRODUCING DEVICE AND COMPOSITION FOR MAGNETIC RECORDING MEDIUM INCLUDING POLYALKYLENEIMINE COMPOUND

(71) Applicant: FUJIFILM Corporation, Tokyo (JP)

(72) Inventors: Wataru Kikuchi, Minami-ashigara (JP); Masatoshi Yumoto, Minami-ashigara (JP); Takashi Imai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 137 days.

(21) Appl. No.: 16/360,758

(22) Filed: Mar. 21, 2019

(65) Prior Publication Data
US 2019/0295585 A1    Sep. 26, 2019

(30) Foreign Application Priority Data

Mar. 22, 2018 (JP) .............. JP2018-054282
Mar. 18, 2019 (JP) .............. JP2019-050156

(51) Int. Cl.
*G11B 5/70* (2006.01)
*G11B 5/706* (2006.01)
*G11B 5/702* (2006.01)
*G11B 5/714* (2006.01)

(52) U.S. Cl.
CPC ........ *G11B 5/70678* (2013.01); *G11B 5/7013* (2013.01); *G11B 5/7023* (2013.01); *G11B 5/7028* (2013.01); *G11B 5/714* (2013.01)

(58) Field of Classification Search
None
See application file for complete search history.

(56) References Cited

U.S. PATENT DOCUMENTS

| 4,048,375 | A | * | 9/1977 | Loewenberg | ............ | G11B 5/70 428/475.2 |
| 5,556,918 | A | * | 9/1996 | Brodt | ................ | B01F 17/0028 525/131 |
| 5,652,320 | A | * | 7/1997 | Takemoto | .......... | C08G 18/0819 528/71 |
| 5,780,167 | A | * | 7/1998 | Bottomley | ................ | C08F 8/44 428/521 |
| 2011/0003241 | A1 | * | 1/2011 | Kaneko | .................... | C09D 7/45 430/7 |
| 2014/0374645 | A1 | * | 12/2014 | Kikuchi | ................ | G11B 5/7013 252/62.54 |
| 2016/0064025 | A1 | * | 3/2016 | Kurokawa | .............. | G11B 5/71 428/840.4 |
| 2016/0276076 | A1 | * | 9/2016 | Kasada | .................. | G11B 5/7013 |
| 2017/0069344 | A1 | * | 3/2017 | Hosoya | ................ | G11B 5/7013 |
| 2017/0316799 | A1 | * | 11/2017 | Shimizu | .................. | G11B 5/70 |
| 2018/0061447 | A1 | * | 3/2018 | Kasada | .................... | G11B 5/70 |

FOREIGN PATENT DOCUMENTS

JP    2004-067941 A    3/2004

* cited by examiner

*Primary Examiner* — Kevin M Bernatz
(74) *Attorney, Agent, or Firm* — Sughrue Mion, PLLC

(57) ABSTRACT

The magnetic recording medium includes: a non-magnetic support; and a magnetic layer including a ferromagnetic powder and a binding agent on the non-magnetic support, in which the magnetic layer further includes a compound including a polyalkyleneimine chain and a vinyl polymer chain. The composition for a magnetic recording medium includes: ferromagnetic powder; and a compound including a polyalkyleneimine chain and a vinyl polymer chain.

12 Claims, No Drawings

MAGNETIC RECORDING MEDIUM, MAGNETIC RECORDING AND REPRODUCING DEVICE AND COMPOSITION FOR MAGNETIC RECORDING MEDIUM INCLUDING POLYALKYLENEIMINE COMPOUND

CROSS-REFERENCE TO RELATED APPLICATIONS

This application claims priority under 35 U.S.C 119 to Japanese Patent Application No. 2018-054282 filed on Mar. 22, 2018 and Japanese Patent Application No. 2019-050156 filed on Mar. 18, 2019. Each of the above applications is hereby expressly incorporated by reference, in its entirety, into the present application.

BACKGROUND OF THE INVENTION

1. Field of the Invention

The present invention relates to a magnetic recording medium, a magnetic recording and reproducing device and a composition for a magnetic recording medium.

2. Description of the Related Art

A coating-type magnetic recording medium (hereinafter, also simply referred to as a "magnetic recording medium") is manufactured by forming a magnetic layer by applying a composition including a ferromagnetic powder and a binding agent onto a non-magnetic support directly or through other layers such as a non-magnetic layer and the like.

In the related art, the binding agent has been an important component regarding improvement of performance of the coating-type magnetic recording medium. Accordingly, various studies have been made regarding the binding agent (for example, see JP2004-067941A).

SUMMARY OF THE INVENTION

By increasing dispersibility of a ferromagnetic powder, it is possible to improve electromagnetic conversion characteristics of a magnetic recording medium. Regarding the improvement of dispersibility of the ferromagnetic powder, a polar group is introduced to a binding agent, as disclosed in JP2004-067941A. The polar group is introduced to the binding agent, in order to increase dispersibility by causing the binding agent to be efficiently adsorbed to the surface of the ferromagnetic powder. However, as disclosed in paragraph 0026 of JP2004-067941A, the introduction of an excessive amount of the polar group to the binding agent tends to decrease the dispersibility of the ferromagnetic powder. Accordingly, it is difficult to sufficiently achieve the improvement of dispersibility of the ferromagnetic powder, by performing the introduction of the polar group to the binding agent.

In addition, regarding improvement of durability of the magnetic recording medium, use of a resin having high mechanical properties as a binding agent of a magnetic layer has been studied, in the related art. In regards to this point, JP2004-067941A has proposed to use a copolymerizable component such as aromatic polyisocyanate, for increasing a concentration of a urethane group, in order to improve mechanical properties of a polyurethane resin used as the binding agent of the magnetic layer. However, as disclosed in paragraph 0025 of JP2004-067941A, as the concentration of the urethane group of the resin used as the binding agent increases, the mechanical properties of the resin can be increased, but solubility decreases. As a result, the dispersibility of the ferromagnetic powder tends to decrease. Accordingly, paragraph 0025 of JP2004-067941A discloses that the concentration of the urethane group should be in a range where the dispersibility of the ferromagnetic powder is maintained in an excellent manner.

As described above, it is difficult to sufficiently achieve both of the improvement of electromagnetic conversion characteristics and the improvement of durability of the magnetic recording medium, by the binding agent used in the related art.

An object of the invention is to provide a magnetic recording medium in which both the improvement of electromagnetic conversion characteristics and the improvement of durability are achieved.

According to one aspect of the invention, there is provided a magnetic recording medium comprising: a non-magnetic support; and a magnetic layer including a ferromagnetic powder and a binding agent on the non-magnetic support, in which the magnetic layer further includes a compound including a polyalkyleneimine chain and a vinyl polymer chain.

According to another aspect of the invention, there is provided a composition for a magnetic recording medium, comprising: ferromagnetic powder; and a compound including a polyalkyleneimine chain and a vinyl polymer chain.

In one aspect, the compound may include a poly(meth) acrylate chain as the vinyl polymer chain.

In one aspect, the compound may include a polystyrene chain as the vinyl polymer chain.

In one aspect, a glass transition temperature Tg of the compound may be 50° C. to 200° C.

In one aspect, an amine value of the compound may be equal to or greater than 0.20 mmol/g.

In one aspect, a weight-average molecular weight of the compound may be equal to or smaller than 30,000.

In one aspect, the magnetic layer or the composition for a magnetic recording medium may include 0.5 to 50.0 parts by mass of the compound with respect to 100.0 parts by mass of the ferromagnetic powder.

In one aspect, an average particle size of the ferromagnetic powder may be 10 to 50 nm.

In one aspect, the ferromagnetic powder may be a hexagonal barium ferrite powder.

In one aspect, the ferromagnetic powder may be a hexagonal strontium ferrite powder.

In one aspect, the ferromagnetic powder may be an s-iron oxide powder.

In one aspect, the composition for a magnetic recording medium may further comprise a binding agent.

According to one aspect of the invention, there is provided a magnetic recording and reproducing device, which includes the above magnetic tape and a magnetic head.

According to one aspect of the invention, it is possible to achieve both the improvement of electromagnetic conversion characteristics and the improvement of durability in the coating-type magnetic recording medium.

DESCRIPTION OF THE PREFERRED EMBODIMENTS

Magnetic Recording Medium

One aspect of the invention relates to a magnetic recording medium including: a non-magnetic support; and a magnetic layer including ferromagnetic powder and a binding agent on the non-magnetic support, in which the magnetic layer further includes a compound including a polyalkyleneimine chain and a vinyl polymer chain.

The magnetic recording medium includes a compound including a polyalkyleneimine chain and a vinyl polymer chain in the magnetic layer. The inventors have surmised that the compound including the polyalkyleneimine chain contributes to the improvement of dispersibility of the ferromagnetic powder, and as a result, the electromagnetic conversion characteristics of the magnetic recording medium can be improved. In addition, the inventors have surmised that the compound including the vinyl polymer chain contributes to an increase in hardness of the magnetic layer, and as a result, the durability of the magnetic recording medium can be improved. However, this is merely a surmise, and the invention is not limited to such a surmise.

The polyalkyleneimine chain means a polymer including two or more alkyleneimine chains which are same as or different from each other. Specific examples of the alkyleneimine chain include an alkyleneimine chain represented by Formula 1 and an alkyleneimine chain represented by Formula 2.

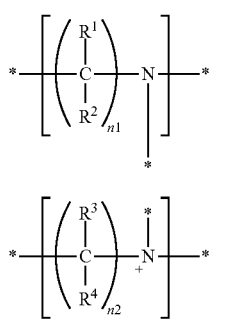

Formula 1

Formula 2

In Formula 1, $R^1$ and $R^2$ each independently represent a hydrogen atom or an alkyl group and n1 represents an integer equal to or greater than 2. In Formula 2, $R^3$ and $R^4$ each independently represent a hydrogen atom or an alkyl group and n2 represents an integer equal to or greater than 2.

The vinyl polymer chain is a polymer chain represented by Formula 3.

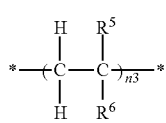

Formula 3

In Formula 3, $R^5$ represents a hydrogen atom or a substituent, $R^6$ represents a substituent, and n3 represents an integer equal to or greater than 2.

In the invention and the specification, "*" regarding a partial structure of the compound (for example, the alkyleneimine chain and the vinyl polymer chain) represents a binding site of the partial structure and an adjacent atom. The bonding of one of two binding sites regarding nitrogen cation (N+) in Formula 2 is normally ion bond of an anion and a nitrogen cation (formation of a salt crosslinking group). The binding at the other binding site represented by "*" is normally a covalent bond.

In the invention and the specification, the disclosed group may have a substituent or may not have a substituent, unless otherwise noted. In addition, the "number of carbons" regarding the group having a substituent means the number of carbons including the number of carbons of the substituent, unless otherwise noted. In the invention and the specification, the examples of the substituent include an alkyl group (for example, an alkyl group having 1 to 6 carbon atoms), a hydroxy group, an alkoxy group (for example, an alkoxy group having 1 to 6 carbon atoms), an halogen atom (for example, a fluorine atom, a chlorine atom, a bromine atom, and the like), a cyano group, an amino group, a nitro group, an acyl group, a carboxy group, salt of a carboxy group, a sulfonic acid group, and salt of a sulfonic acid group. The substituent which may be included in Formula 3 will be described later.

Hereinafter, the magnetic recording medium will be described more specifically.

Compound Including Polyalkyleneimine Chain and Vinyl Polymer Chain

Polyalkyleneimine Chain $R^1$ and $R^2$ in the alkyleneimine chain represented by Formula 1 and $R^3$ and $R^4$ in the alkyleneimine chain represented by Formula 2 each independently represent a hydrogen atom or an alkyl group. The alkyl group can be an alkyl group having 1 to 6 carbon atoms, is preferably an alkyl group having 1 to 3 carbon atoms, more preferably a methyl group or an ethyl group, and even more preferably a methyl group. The alkyl group is preferably a non-substitutional alkyl group. Examples of a combination of $R^1$ and $R^2$ in Formula 1 include an aspect in which one is a hydrogen atom and the other one is an alkyl group, an aspect in which both are hydrogen atoms, an aspect in which both are alkyl groups (alkyl groups which are same or different from each other), and preferably an aspect in which both are hydrogen atoms. The same applies to $R^3$ and $R^4$ in Formula 2.

A structure having the smallest number of carbons configuring a ring as alkyleneimine is ethylene imine, and the number of carbons of a main chain of the alkyleneimine chain (ethylene imine chain) obtained by ring opening of ethylene imine. Accordingly, the lower limit of n1 in Formula 1 and n2 in Formula 2 is 2. That is, n1 in Formula 1 and n2 in Formula 2 each independently represent an integer equal to or greater than 2. From a viewpoint of further improving electromagnetic conversion characteristics, n1 in Formula 1 and n2 in Formula 2 are each independently preferably equal to or smaller than 10, more preferably equal to or smaller than 6, even more preferably equal to or smaller than 4, still preferably 2 or 3, still more preferably 2.

Vinyl Polymer Chain

Regarding the vinyl polymer chain, $R^5$ in Formula 3 represents a hydrogen atom or a substituent, and, for example, represents a hydrogen atom or a methyl group. $R^6$ represents a substituent. Examples of the substituent represented by $R^6$ include an alkyloxycarbonyl group, hydroxyalkyloxycarbonyl group, and aryl group, and specific examples thereof include substituents including exemplified compounds which will be described later. The alkyl including an alkyloxycarbonyl group and the alkyl group substituted with a hydroxy group included in a hydroxyalkyloxycarbonyl group can be a linear alkyl group, a branched alkyl group, or a cyclic alkyl group. The number of carbons of the linear alkyl group and the branched alkyl group can be, for example, 1 to 20. The number of carbons of the cyclic alkyl group can be, for example, 3 to 20. The cyclic alkyl group includes a monocyclic alkyl group and a polycyclic alkyl group (for example, a bicycloalkyl group). An aryl group can be an aryl group having 6 to 20 carbon atoms, and specific examples thereof include a phenyl group.

The structure of the vinyl polymer chain including the compound is derived from a structure of a vinyl monomer used for synthesis of the compound. The vinyl monomer is a compound including a vinyl group and/or a vinylidene group. Examples of the vinyl monomer include (meth) acrylic acid esters, crotonic acid esters, vinyl esters, maleic acid diesters, fumaric acid diesters, itaconic acid diesters, (meth)acrylamides, styrenes, vinyl ethers, vinyl ketones, olefins, maleimides, and (meth)acrylonitrile. The above expression of plurality is used as a meaning including a derivative thereof. For example, styrenes are used as a meaning including styrene and a styrene derivative. In addition, in the invention and the specification, "(meth) acryl" is used as a meaning including acryl and methacryl. For example, by using (meth)acrylic acid ester as the vinyl monomer, a compound including a poly(meth)acrylate chain as the vinyl polymer chain can be obtained. In addition, for example, by using styrene as the vinyl monomer, a compound including a polystyrene chain as the vinyl polymer chain can be obtained.

In the vinyl monomer, from a viewpoint of further improving durability of a magnetic recording medium, the preferable vinyl polymer is (meth)acrylic acid esters and styrenes, and more preferable vinyl polymer is (meth)acrylic acid esters. Specific examples of (meth)acrylic acid esters include methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, lauryl (meth)acrylate, amyl (meth)acrylate, n-hexyl (meth) acrylate, cyclohexyl (meth)acrylate, t-butylcyclohexyl (meth)acrylate, 2-ethylhexyl (meth)acrylate, t-octyl (meth) acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth) acrylate, 2-methoxyethyl (meth)acrylate, 2-ethoxyethyl (meth)acrylate, 2-(2-methoxyethoxy) ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, propylene glycol monomethyl ether (meth) acrylate, polyethylene glycol monomethyl ether (meth)acrylate, polyethylene glycol monoethyl ether (meth)acrylate, β-phenoxyethoxyethyl (meth)acrylate, nonylphenoxy polyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, γ-butyrolactone (meth)acrylate, isobornyl (meth)acrylate, furfuryl (meth)acrylate, and tetrahydrofurfuryl (meth)acrylate.

Regarding the vinyl polymer chain, n3 in Formula 3 is an integer equal to or greater than 2, and is preferably an integer equal to or greater than 5, and more preferably an integer equal to or greater than 7, from a viewpoint of further improving durability of the magnetic recording medium. In addition, n3 can be, for example, an integer equal to or smaller than 100, and is preferably an integer equal to or smaller than 80 and more preferably an integer equal to or smaller than 70, from a viewpoint of further improving electromagnetic conversion characteristics. In Formula 3, n3 is an integer equal to or greater than 2, and thus, a plurality of $R^5$'s are included in Formula 3. A plurality of $R^5$'s may be the same as or different from each other. The same applies to $R^6$.

Hereinafter, specific examples of the vinyl polymer chain are shown. However, the invention is not limited to the following specific examples. The compound can be a compound including only one kind of vinyl polymer chain, and can also be a compound including two or more kinds of vinyl polymer chains having different structures. The following n3 is the same as n3 in Formula 3 described above.

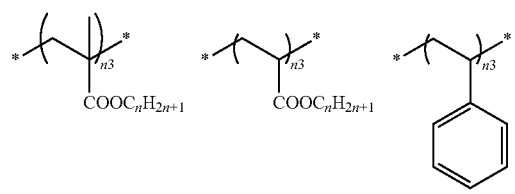

(n, for example, represents an integer of 1 to 20.)

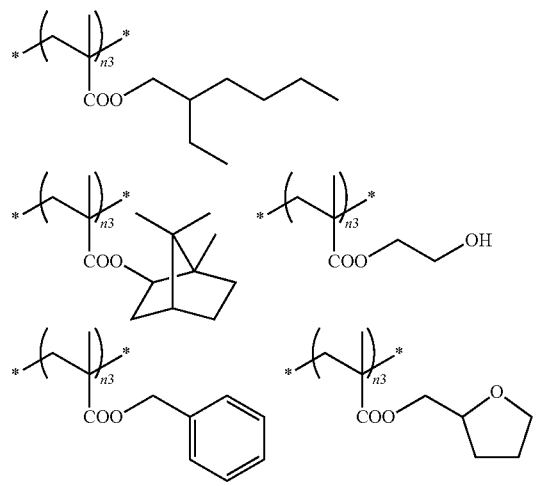

Various Physical Properties of Compound
Glass Transition Temperature Tg

Regarding the physical properties of the compound, from a viewpoint of further improving durability of the magnetic recording medium, a glass transition temperature Tg is preferably equal to or higher than 50° C., more preferably equal to or higher than 55° C., even more preferably equal to or higher than 60° C., still preferably equal to or higher than 65° C., still more preferably equal to or higher than 70° C., still even more preferably equal to or higher than 80° C., still further preferably equal to or higher than 85° C., and still even further more preferably equal to or higher than 90° C. The glass transition temperature Tg of the compound can be controlled depending on a percentage of the vinyl polymer chain occupying the structure of the compound, for example, and as the percentage of the vinyl polymer chain is high, the glass transition temperature Tg of the compound tends to increase. In addition, the glass transition temperature Tg of the compound can also be controlled by the structure of the vinyl polymer chain, for example. By introducing a side chain causing a decrease in mobility of the main chain of the vinyl polymer chain, the glass transition temperature Tg tends to increase. The glass transition temperature Tg of the compound can be, for example, equal to or lower than 200° C., and can also be equal to or lower than 190° C., equal to or lower than 180° C., equal to or lower than 170° C., or equal to or lower than 160° C.

In the invention and the specification, the glass transition temperature Tg of the compound is a value obtained by differential scanning calorimetry measurement. Regarding the measurement conditions, JIS K7121-1987 can be referred to. Regarding the specific measurement method, examples which will be described later can be referred to. It is preferable that 5.00 to 10.00 mg of a sample for measurement is weighed using a weighing device (for example, chemical balance) capable of weighing up to a unit of 0.01 mg and, a container for measurement is filled with the sample for measurement and used for measurement. In a case where the sample for measurement is a powder sample, a particle size of the particles configuring the powder is preferably equal to or smaller than 0.5 mm.

Amine Value

From a viewpoint of further improving electromagnetic conversion characteristics, an amine value of the compound is preferably equal to or greater than 0.20 mmol/g, more preferably equal to or greater than 0.25 mmol/g, even more preferably equal to or greater than 0.30 mmol/g, still preferably equal to or greater than 0.35 mmol/g, still more preferably equal to or greater than 0.40 mmol/g, still even more preferably equal to or greater than 0.45 mmol/g, and still further more preferably equal to or greater than 0.50 mmol/g. The amine value of the compound can be, for example, controlled depending on a percentage of the polyalkyleneimine chain occupying the structure of the compound.

As the percentage of equal to or higher than polyalkyleneimine chain is high, the amine value of the compound tends to increase. Accordingly, as the amine value of the compound is high, the percentage of the vinyl polymer chain occupying the structure of the compound tends to relatively decrease. As the percentage of the vinyl polymer chain is high, the glass transition temperature Tg increases, and thus, it is preferable from a viewpoint of further improving durability of the magnetic recording medium. In considering of this point, the amine value of the compound is preferably equal to or smaller than 1.50 mmol/g, more preferably equal to or smaller than 1.30 mmol/g, and even more preferably equal to or smaller than 1.20 mmol/g.

In the invention and the specification, the amine value of the compound is a value measured by a potentiometric method (solvent: tetrahydrofuran/water=100/10 (volume ratio), titrant: 0.01 N (0.01 mol/l) hydrochloric acid (amine value)), and is the value of mmol of the base equivalent to the hydrochloric acid necessary for neutralization of 1 g of the sample. In the examples which will be described later, the amine value was obtained using potassium hydroxide (KOH) as the base.

Weight-Average Molecular Weight

The weight-average molecular weight of the compound is preferably smaller than a weight-average molecular weight of a binding agent of a typical coating-type magnetic recording medium, from a viewpoint of further improving electromagnetic conversion characteristics. From this viewpoint, the weight-average molecular weight of the compound is preferably equal to or smaller than 30,000, more preferably equal to or smaller than 25,000, even more preferably equal to or smaller than 20,000, and still preferably equal to or smaller than 18,000. On the other hand, from a viewpoint of further improving durability of the magnetic recording medium, the weight-average molecular weight of the compound is preferably equal to or greater than 1,000, more preferably equal to or greater than 1,200, and even more preferably equal to or greater than 1,500.

In the invention and the specification, the average molecular weight (weight-average molecular weight and number average molecular weight which will be described later) is a value obtained by performing standard polystyrene conversion of a value measured by gel permeation chromatography (GPC). The average molecular weight shown in the examples which will be described later is a value (polystyrene-converted value) obtained by performing standard polystyrene conversion of a value measured using the GPC under the following measurement conditions.

GPC device: HLC-8220 (manufactured by Tosoh Corporation)

Guard Column: TSK gel guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three kinds of columns are linked in series Eluent: Tetrahydrofuran (THF), including stabilizer (2,6-di-t-butyl-4-methylphenol)

Eluent flow rate: 0.35 mL/min

Column temperature: 40° C.

Inlet temperature: 40° C.

Refractive index (RI) measurement temperature: 40° C.

Sample concentration: 0.3 mass %

Sample injection amount: 10 μL

Synthesis Method of Compound

The compound may be a compound including the polyalkyleneimine chain and the vinyl polymer chain, and the synthesis method thereof is not particularly limited. For example, by causing a reaction between polyalkyleneimine and a vinyl polymer including a functional group capable of reacting with an amino group on one terminal (hereinafter, also referred to as an "intermediate"), it is possible to obtain the compound including the polyalkyleneimine chain and the vinyl polymer chain by forming a bond by the amino group included in polyalkyleneimine and the functional group. The bond can be covalent bond or ion bond (formation of salt crosslinking group), as described above. Examples of the functional group capable of reacting with the amino group included in the intermediate include a functional group capable of causing a condensation reaction between an amino group and acid, a functional group capable of causing an acid formation reaction between an amino group and acid, and a functional group causing an addition reaction of an amino group, and specific examples thereof include a carboxy group, an acrylate group, a methacrylate group, and an isocyanate group. The intermediate can synthesized by reacting one or more kinds of vinyl monomer and the compound including a functional group capable of reacting with an amino group in a well-known reaction solvent. As the compound including a functional group capable of reacting with an amino group, a thiol compound including one functional group capable of reacting with an amino group and one thiol group in one molecule can be used. The thiol compound can function as a chain transfer agent. Examples of the thiol compound include mercaptopropionic acid, thioglycolic acid, thiomalic acid, thiolactic acid, 2-mercaptobenzoic acid, 3-mercaptobenzoic acid, and 4-mercaptobenzoic acid.

In addition, the synthesis reaction of the intermediate can be performed using a well-known polymerization initiator. Regarding the reaction conditions, a well-known technology regarding the polymerization reaction of the vinyl polymer and a well-known technology regarding the reaction of the thiol compound can be used. The glass transition temperature Tg of the compound can be adjusted mainly depending on the glass transition temperature Tg of the intermediate. The preferable range of the glass transition temperature Tg of the intermediate is the same as the range of the compound described above. In addition, the weight-average molecular weight of the intermediate can be, for example, 1,000 to 30,000 and is preferably 1,500 to 25,000.

The polyalkyleneimine is a polymer obtained by ring opening polymerization of alkyleneimine. The polyalkyleneimine can be synthesized by a well-known polymerization reaction and can also be purchased as a commercially available product. In the invention and the specification, the "polymer" is used as a meaning including a homopolymer and a copolymer. As the polyalkyleneimine, polyalkyleneimine having a number average molecular weight of 200 to 10,000 is suitable.

By reacting polyalkyleneimine and the intermediate, the compound including the polyalkyleneimine chain and the vinyl polymer chain can be obtained by forming a bond by the amino group included in polyalkyleneimine and the functional group included in the intermediate. The compound can be a random copolymer and a block copolymer. Regarding a mixing ratio of polyalkyleneimine and the intermediate in the reaction described above, a mol number of the functional group included in the intermediate with respect to 1 mol of the amino group included in polyalkyleneimine is preferably 0.20 to 1.20 mol and more preferably 0.40 to 1.10 mol, from a viewpoint of adjusting the amine value and/or the glass transition temperature Tg in the preferred range described above. Regarding the reaction conditions of the reaction, a well-known technology can be used.

In one aspect, the compound obtained by the reaction of polyalkyleneimine and the intermediate can also be subjected to acid modification by reacting with acid anhydride. The acid modification is preferably from a viewpoint of further improving electromagnetic conversion characteristics. The acid anhydride reacts with an unreacted amino group of a polyalkyleneimine chain of a compound obtained by causing a reaction of the polyalkyleneimine and the intermediate, to perform the acid modification of the compound. Regarding the reaction conditions of the acid modification, a well-known technology can be used.

As the acid anhydride which can be used for acid modification, the following acid anhydride can be used, for example.

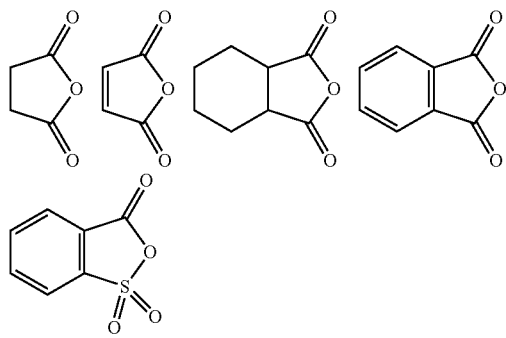

A compound including one or more kinds of partial structures selected from the group consisting of a partial structure represented by Formula 4 and a partial structure represented by Formula 5 can be obtained by the acid modification, in addition to the polyalkyleneimine chain and the vinyl polymer chain.

Formula 4

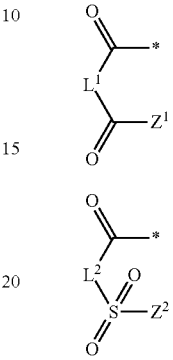

Formula 5

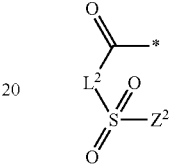

$L^1$ in Formula 4 and $L^2$ in Formula 5 each independently represent a divalent linking group, $Z^1$ in Formula 4 and $Z^2$ in Formula 5 each independently represent a monovalent group represented by —OM or a monovalent group represented by —O$^-$A$^+$, M represents a hydrogen atom or an alkali metal atom, and A$^+$ represents an ammonium cation.

$L^1$ in Formula 4 and $L^2$ in Formula 5 each independently represent a divalent linking group. As the divalent linking group, a divalent linking group configured with one selected from or a combination of two or more groups selected from the group consisting of an alkylene group which may have a linear, branched, or a cyclic structure, an alkenylene group which may have a linear, branched, or a cyclic structure, an aromatic group, —C(=O)—, and —O—. The aromatic group may or may not include a hetero atom and it is preferable that the aromatic group does not include a hetero atom (that is, arylene group). Examples of preferable divalent linking group include an alkylene group having 1 to 10 carbon atoms, an alkenylene group having 2 to 10 carbon atoms, and an aromatic group having 6 to 12 carbon atoms. Examples of more preferable divalent linking group include an alkylene group having 1 to 10 carbon atoms and an aromatic group having 6 to 12 carbon atoms. Examples of even more preferable divalent linking group include a linear alkylene group having 1 to 5 carbon atoms, a cycloalkylene group having 6 to 10 carbon atoms, and an arylene group having 6 to 12 carbon atoms.

$Z^1$ in Formula 4 and $Z^2$ in Formula 5 each independently represent a monovalent group represented by —OM or a monovalent group represented by —O$^-$A$^+$.

In —OM, M represents a hydrogen atom or an alkali metal atom. The alkali metal atom is, for example, a sodium atom and a potassium atom. The monovalent group represented by —OM is preferably —OH (that is, hydroxy group), —ONa or —OK, and more preferably —OH or ONa.

In —O$^-$A$^+$, A$^+$ represents an ammonium cation. In —O$^-$A$^+$, the ammonium cation represented by oxygen anion and A$^+$ is bonded by ion bond to form salt. The ammonium cation can be represented by N$^+$(R$^{11}$)$_4$. In N$^+$(R$^{11}$)$_4$, four R$^{11}$'s each independently represent a hydrogen atom or a hydrocarbon group. In a case where the ammonium cation is an organic ammonium cation, at least one of four R$^{11}$'s represents a hydrocarbon group. The hydrocarbon group is preferably an alkyl group. The alkyl group may be any alkyl group of linear, branched, and cyclic alkyl group, and is preferably a linear alkyl group. The number of carbons of the alkyl group is, for example, 1 to 10 and preferably 1 to 6. The four $R^{11}$'s may be same as each other or some or all of $R^{11}$'s may be different from each other. In $N^+(R^{11})_4$, all of the four $R^{11}$'s may be hydrogen atoms or all thereof may be hydrocarbon groups. In $N^+(R^{11})_4$, one to three $R^{11}$'s are hydrocarbon groups and $R^{11}$'s other than the hydrocarbon group is preferably a hydrogen atom.

In a case where the compound is a compound subjected to acid modification, the compound may include only one kind of a partial structure selected from the group consisting of the partial structure represented by Formula 4 and the partial structure represented by Formula 5, and may include two or more kinds having different structures. In a case where the compound is a compound subjected to acid modification, the number of partial structures selected from the group consisting of the partial structure represented by Formula 4 and the partial structure represented by Formula 5 is preferably equal to or greater than 1, more preferably 1 to 5, and even more preferably 2 to 5 with respect to one molecule, from a viewpoint of further improving electromagnetic conversion characteristics.

Content of Compound

A content of the compound is preferably equal to or greater than 0.5 parts by mass, more preferably equal to or greater than 1.0 parts by mass, even more preferably equal to or greater than 3.0 parts by mass, still preferably equal to or greater than 5.0 parts by mass, still more preferably equal to or greater than 10.0 parts by mass, still even more preferably equal to or greater than 15.0 parts by mass, and still further more preferably equal to or greater than 20.0 parts by mass, with respect to 100.0 parts by mass of the ferromagnetic powder in the magnetic layer, from viewpoints of the improvement of electromagnetic conversion characteristics and the improvement of durability. Meanwhile, in order to improve a recording density, it is preferable to increase a filling percentage of the ferromagnetic powder in the magnetic layer. From this viewpoint, the content of the component other than the ferromagnetic powder is preferably relatively low. From this viewpoint, the content of the compound in the magnetic layer is preferably equal to or smaller than 50.0 parts by mass, more preferably equal to or smaller than 40.0 parts by mass, and even more preferably equal to or smaller than 35.0 parts by mass, with respect to 100.0 parts by mass of the ferromagnetic powder. The same also applies to the content of the compound with respect to 100.0 parts by mass of the ferromagnetic powder in the composition for a magnetic recording medium according to one aspect of the invention. The compound may be included in a non-magnetic layer and/or a back coating layer which will be described later, in order to improve hardness of each layer, for example. Regarding the content of the compound in each layer in this case, the content thereof with respect to 100.0 parts by mass of the ferromagnetic powder can be used by replacing the content thereof with respect to 100.0 parts by mass of the non-magnetic powder.

Ferromagnetic Powder

The magnetic recording medium includes a ferromagnetic powder and a binding agent in a magnetic layer, together with the compound described above. As the ferromagnetic powder included in the magnetic layer, ferromagnetic powder known as ferromagnetic powder used in the magnetic layer of various magnetic recording media can be used. It is preferable to use ferromagnetic powder having a small average particle size, from a viewpoint of improvement of recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still preferably equal to or smaller than 30 nm, still more preferably equal to or smaller than 25 nm, and still even more preferably equal to or smaller than 20 nm. Meanwhile, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm, from a viewpoint of stability of magnetization.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is to be understood to mean ferromagnetic powder from which a hexagonal ferrite type crystal structure can be detected as a main phase by X-ray diffraction analysis. The main phase is to be understood to mean a structure to which the diffraction peak with the highest intensity in an X-ray diffraction spectrum obtained by X-ray diffraction analysis is assigned. For example, when the diffraction peak with the highest intensity in an X-ray diffraction spectrum obtained by X-ray diffraction analysis is assigned to the hexagonal ferrite type crystal structure, it shall be determined that the hexagonal ferrite type crystal structure is detected as a main phase. When a single structure is only detected by X-ray diffraction analysis, this detected structure is determined as a main phase. The hexagonal ferrite type crystal structure at least contains, as constitutional atoms, an iron atom, a divalent metal atom, and an oxygen atom. A divalent metal atom is a metal atom which can convert into a divalent cation as an ion thereof, and examples thereof include alkaline earth metal atoms, such as a strontium atom, a barium atom, and a calcium atom, and a lead atom. In the invention and the specification, the hexagonal strontium ferrite powder is to be understood to mean powder in which a main divalent metal atom contained therein is a strontium atom, and the hexagonal barium ferrite powder is to be understood to mean powder in which a main divalent metal atom contained therein is a barium atom. The main divalent metal atom is to be understood to mean a divalent metal atom having the highest content in terms of atom % among divalent metal atoms contained in this powder. However, the divalent metal atom does not include rare earth atoms. In the invention and the specification, the rare earth atoms are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described in more detail.

The activation volume of the hexagonal strontium ferrite powder is preferably 800 to 1,600 nm$^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm$^3$ and can also be, for example equal to or greater than 850 nm$^3$. In addition, from a viewpoint of further improving electromagnetic conversion characteristics, the activation volume of the hexagonal strontium ferrite powder is more preferably equal to or smaller than 1,500 nm$^3$, even more preferably equal to or smaller than 1,400 nm$^3$, still preferably equal to or smaller than 1,300 nm$^3$, still more preferably equal to or smaller than 1,200 nm$^3$, and still even more preferably equal to or smaller than 1,100 nm$^3$. The same can be applied to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using a vibrating sample magnetometer (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include rare earth atom. In a case where the hexagonal strontium ferrite powder includes rare earth atom, it preferably includes rare earth atom in a content (bulk content) of 0.5 to 5.0 atom %, with respect to 100 atom % of iron atom is 0.5 to 5.0 atom %. In one aspect, the hexagonal strontium ferrite powder which includes rare earth atom can have a rare earth atom surface portion uneven distribution. The "rare earth atom surface portion uneven distribution" of the invention and the specification means that a rare earth atom content with respect to 100 atom % of iron atom in a solution obtained by partially dissolving the hexagonal strontium ferrite powder with acid (referred to as a "rare earth atom surface portion content" or simply as a "surface portion content" for rare earth atom) and a rare earth atom content with respect to 100 atom % of iron atom in a solution obtained by totally dissolving the hexagonal strontium ferrite powder with acid (referred to as a "rare earth atom bulk content" or simply as a "bulk content" for rare earth atom) satisfy a ratio of "rare earth atom surface portion content/rare earth atom bulk content >1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The rare earth atom surface portion content satisfying a ratio of "rare earth atom surface portion content/rare earth atom bulk content >1.0" means that the rare earth atoms are unevenly distributed in the surface portion (that is, a larger amount of the rare earth atom is present, compared to that inside), in the particles configuring the hexagonal strontium ferrite powder. The surface portion of the specification and the specification means a part of the region of the particles configuring the hexagonal strontium ferrite powder from the inside from the surface.

In a case where the hexagonal strontium ferrite powder includes rare earth atom, the hexagonal strontium ferrite powder preferably includes rare earth atom having a content (bulk content) of 0.5 to 5.0 atom % with respect to 100 atom % of an iron atom. It is surmised that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised that it is because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. This is surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is also surmised that, by using the hexagonal strontium ferrite powder having a rare earth atom surface portion uneven distribution as ferromagnetic powder of the magnetic layer, chipping of the surface of the magnetic layer due to sliding with a magnetic head can be prevented. That is, it is surmised that the hexagonal strontium ferrite powder having a rare earth atom surface portion uneven distribution also contributes to improvement of running durability of a magnetic recording medium. It is surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the rare earth atom content (bulk content) is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder which includes rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes rare earth atom, the rare earth atom included therein may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having a rare earth atom surface portion uneven distribution, a degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" is greater than 1.0 and can be equal to or greater than 1.5. The surface portion content satisfying a ratio of "surface portion content/bulk content >1.0" means that the rare earth atoms are unevenly distributed in the surface portion (that is, a larger amount of the rare earth atoms is present, compared to that inside), in the particles configuring the hexagonal strontium ferrite powder. In addition, the ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, the "surface portion content/bulk content" is not limited to the exemplified upper limit or the lower limit, as long as the rare earth atom is unevenly distributed in the surface portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 µm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

From a viewpoint of increasing reproducing output in a case of reproducing information recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface portion uneven distribution, σs tends to significantly decrease, compared to that in hexagonal strontium ferrite powder not including the rare earth atom. With respect to this, it is surmised that, hexagonal strontium ferrite powder having the rare earth atom surface portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m²/kg. On the other hand, from a viewpoint of noise reduction, σs is preferably equal to or smaller than 80 A·m²/kg and more preferably equal to or smaller than 60 A·m²/kg. σs can be measured by using a known measurement device capable of measuring magnetic properties such as a vibrating sample magnetometer. Unless stated otherwise, the mass magnetization σs is a value measured at a magnetic field strength of 15 kOe. With regard to the unit of σs, 1[kOe]=$10^6/4\pi$[A/m]

With regard to the contents (bulk contents) of the constituting atoms of the hexagonal strontium ferrite powder, the content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, may include a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, ε-iron oxide powder can also be used. In the invention and the specification, the "ε-iron oxide powder" is to be understood to mean ferromagnetic powder from which an ε-iron oxide type crystal structure can be detected as a main phase by X-ray diffraction analysis. For example, when the diffraction peak with the highest intensity in an X-ray diffraction spectrum obtained by X-ray diffraction analysis is assigned to the ε-iron oxide type crystal structure, it shall be determined that the ε-iron oxide type crystal structure is detected as a main phase. As a method for producing ε-iron oxide powder, a method for producing ε-iron oxide powder from goethite and a reverse micelle method has been known. Both of the above-described production methods has been publicly known. Moreover, J. Jpn. Soc. Powder Metallurgy Vol. 61 Supplement, No. S1, pp. 5280-S284 and J. Mater. Chem. C, 2013, 1, pp. 5200-5206 can be referred to about a method for producing ε-iron oxide powder where some of Fe are substituted with substitutional atoms such as Ga, Co, Ti, Al, and Rh, for example. The method for producing ε-iron oxide powder which can be used as ferromagnetic powder in a magnetic layer of the magnetic recording medium, however, is not limited to these methods.

The activation volume of the ε-iron oxide powder is preferably 300 to 1,500 nm³. The atomized ε-iron oxide powder showing the activation volume in the range described above is suitable for manufacturing a magnetic recording medium exhibiting excellent electromagnetic conversion characteristics. The activation volume of the ε-iron oxide powder is preferably equal to or greater than 300 nm³ and can also be, for example equal to or greater than 500 nm³. In addition, from a viewpoint of further improving electromagnetic conversion characteristics, the activation volume of the ε-iron oxide powder is more preferably equal to or smaller than 1,400 nm³, even more preferably equal to or smaller than 1,300 nm³, still preferably equal to or smaller than 1,200 nm³, and still more preferably equal to or smaller than 1,100 nm³.

The anisotropy constant Ku can be used as an index of reduction of thermal fluctuation, that is, improvement of thermal stability. The ε-iron oxide powder can preferably have Ku equal to or greater than $3.0 \times 10^4$ J/m³, and more preferably have Ku equal to or greater than $8.0 \times 10^4$ J/m³. In addition, Ku of the ε-iron oxide powder can be, for example, equal to or smaller than $3.0 \times 10^5$ J/m³. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization σs of ferromagnetic powder included in the magnetic recording medium is high. In regards to this point, in one aspect, σs of the ε-iron oxide powder can be equal to or greater than 8 A·m$^2$/kg and can also be equal to or greater than 12 A·m$^2$/kg. On the other hand, from a viewpoint of noise reduction, σs of the ε-iron oxide powder is preferably equal to or smaller than 40 A·m$^2$/kg and more preferably equal to or smaller than 35 A·m$^2$/kg.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper, shown on a display or the like so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic recording medium in order to measure the particle size, a method disclosed in paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent or the compound and one or more kinds of additives may be randomly included.

A high filling percentage of the ferromagnetic powder in the magnetic layer is preferable from a viewpoint of improvement recording density.

Binding Agent and Curing Agent

The magnetic recording medium is a coating-type magnetic recording medium and includes a binding agent in the magnetic layer. The binding agent is one or more kinds of resin. As the binding agent, various resins normally used as a binding agent of a coating-type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 35,000 to 200,000 as a weight-average molecular weight. The content of the binding agent in the magnetic layer can be, for example, 5.0 to 50.0 parts by mass and s preferably 10.0 to 30.0 parts by mass, with respect to 100.0 parts by mass of the ferromagnetic powder. In the invention and the specification, a given component may be used alone or in combination of two or more kinds thereof, unless otherwise noted. In a case where two or more kinds are used, in the invention and the specification, the content regarding a given component is a total content of the two or more kinds.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes the compound, ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder which can function as a projection formation agent which forms projections suitably protruded from the surface of the magnetic layer, and the like can be used. As the additives, a commercially available product can be suitably selected according to the desired properties or manufactured by a well-known method, and can be used with any amount. For example, regarding the lubricant, a description disclosed in paragraphs 0030 to 0033, 0035, and 0036 of JP2016-126817A can be referred to. The non-magnetic layer may include a lubricant. Regarding the lubricant included in the non-magnetic layer, a description disclosed in paragraphs 0030, 0031, 0034, 0035, and 0036 of JP2016-126817A can be referred to. Regarding the dispersing agent, a description disclosed in paragraphs 0061 and 0071 of JP2012-133837A can be referred to. The dispersing agent may be included in the non-magnetic layer. Regarding the dispersing agent included in the non-magnetic layer, a description disclosed in paragraph 0061 of JP2012-133837A can be referred to.

Preparation of Magnetic Layer Forming Composition

The magnetic layer can be formed using a magnetic layer forming composition including various components described above. The magnetic layer forming composition generally includes a solvent. As the solvent, an organic solvent used for manufacturing a coating-type magnetic recording medium can be generally used. Specifically, ketones such as acetone, methyl ethyl ketone, methyl isobutyl ketone, diisobutyl ketone, cyclohexanone, isophorone, or tetrahydrofuran, alcohols such as methanol, ethanol, propanol, butanol, isobutyl alcohol, isopropyl alcohol, or methylcyclohexanol, esters such as methyl acetate, butyl acetate, isobutyl acetate, isopropyl acetate, ethyl lactate, or glycol acetate, glycol ethers such as glycol dimethyl ether, glycol monoethyl ether, or dioxane, aromatic hydrocarbons such as benzene, toluene, xylene, cresol, or chlorobenzene, chlorinated hydrocarbons such as methylene chloride, ethylene chloride, carbon tetrachloride, chloroform, ethylene chlorohydrin, or dichlorobenzene, N, N-dimethylformamide, hexane, and the like can be used with any ratio. Among these, an organic solvent including ketones (ketone-based organic solvent) is preferably used, from viewpoints of solubility of the binding agent normally used in the magnetic recording medium and adsorption of the binding agent to the surface of ferromagnetic powder. The amount of the solvent in the magnetic layer forming composition may be the same as the amount of the magnetic layer forming composition of the typical coating-type magnetic recording medium.

The magnetic layer forming composition can be prepared by adding and mixing the various components described above at the same time or any order. The preparation method of the composition is not particularly limited, and a well-known technology regarding the preparation of the magnetic layer forming composition of the coating-type magnetic recording medium can be used.

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on the surface of the non-magnetic support or may include a magnetic layer on the surface of the non-magnetic support directly or indirectly through the non-magnetic layer including the non-magnetic powder and the binding agent. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including non-magnetic powder and a binding agent on a surface side of the non-magnetic support opposite to the surface side provided with the magnetic layer. The back coating layer preferably includes one or both of carbon black and inorganic powder. In regards to the binding agent included in the back coating layer and various additives which can be randomly included therein, a well-known technology regarding the back coating layer can be applied, and a well-known technology regarding the treatment of the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Various Thicknesses

A thickness of the non-magnetic support is preferably 3.0 to 20.0 μm, more preferably 3.0 to 10.0 μm, and even more preferably 3.0 to 6.0 μm.

A thickness of the magnetic layer can be optimized according to a saturation magnetization amount of a magnetic head used, a head gap length, a recording signal band, and the like. The thickness of the magnetic layer is preferably 10 nm to 150 nm, and is more preferably 20 nm to 120 nm, and even more preferably 30 nm to 100 nm from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and is preferably 0.1 to 1.0 μm.

A thickness of the back coating layer is preferably equal to or smaller than 0.9 μm and even more preferably 0.1 to 0.7 μm.

The thicknesses of various layers of the magnetic recording medium and the non-magnetic support can be acquired by a well-known film thickness measurement method. As an example, a cross section of the magnetic recording medium in a thickness direction is, for example, exposed by a well-known method of ion beams or microtome, and the exposed cross section is observed with a scanning electron microscope. In the cross section observation, various thicknesses can be acquired as a thickness acquired at any one portion of the cross section, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

A step of preparing the composition for forming the magnetic layer, and the non-magnetic layer and the back coating layer which are randomly provided, include at least a kneading step, a dispersing step, or a mixing step provided before and after these steps, if necessary. Each step may be divided into two or more stages. All of raw materials used in the invention may be added at an initial stage or in a middle stage of each step. In addition, each raw material may be separately added in two or more steps. In order to prepare each layer forming composition, a well-known technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-079274A (JP-H01-079274A). In addition, in order to disperse each layer forming composition, as a dispersion medium, at least one or more kinds of dispersion beads selected from the group consisting of glass beads and other dispersion beads can be used. As such dispersion beads, zirconia beads, titania beads, and steel beads which are dispersion beads having high specific gravity are suitable. These dispersion beads are preferably used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed by directly applying the magnetic layer forming composition onto the surface of the non-magnetic support or through a step of performing multilayer coating with the non-magnetic layer forming composition in order or at the same time. The back coating layer can be formed through a step of applying a back coating layer forming composition onto a surface of the non-magnetic support opposite to the surface provided with the magnetic layer (or to be provided with the magnetic layer).

After the coating step, various processes such as a drying process, an alignment process of the magnetic layer, and a surface smoothing treatment (calender process) can be performed. Regarding the coating step and various processes, a well-known technology can be used, and for example, a description disclosed in paragraphs 0051 to 0057 of JP2010-024113 can be referred to.

The magnetic recording medium according to one aspect of the invention can be a tape-shaped magnetic recording medium (magnetic tape) in one aspect, and can be a disk-shaped magnetic recording medium (magnetic disk) in another aspect.

In the magnetic recording medium thus prepared, a servo pattern may be formed by a known method, in order to allow control of tracking of a magnetic head and control of the running speed of the magnetic recording medium to be performed in the magnetic recording and reproducing device. The "formation of a servo pattern" can also be referred to as "recording of a servo signal". The magnetic recording medium can be a tape-shaped magnetic recording medium (magnetic tape), and can be a disk-shaped magnetic recording medium (magnetic disk). Formation of the servo pattern in a magnetic tape will be described below, as an example.

The servo pattern is generally recorded along the longitudinal direction of the magnetic tape. Examples of control (servo control) systems utilizing servo signals include timing-based servo (TBS), amplitude servo, and frequency servo.

As shown in European Computer Manufacturers Association (ECMA)-319, a timing-based servo technique has been employed in a magnetic tape (generally referred to as "LTO tape") in accordance with Linear Tape-Open (LTO) specifications. In this timing-based servo technique, the servo patterns are configured of consecutive alignment of a plurality of pairs of magnetic stripes (also referred to as "servo stripes"), in each pair of which magnetic stripes are not parallel with each other, in the longitudinal direction of the magnetic tape. The reason why the servo signal is configured of pairs of magnetic stripes, in each pair of which magnetic stripes are not parallel with each other, is to teach a passing position to a servo signal reading element passing over the servo pattern. Specifically, the pairs of magnetic stripes are formed so that the intervals consecutively change along the width direction of the magnetic tape, and relative positions of the servo pattern and the servo signal reading element can be determined by reading the intervals with the servo signal reading element. The information on this relative positions enable the data track to be tracked. Thus, a plurality of servo tracks are generally set over the servo signal along the width direction of the magnetic tape.

The servo band is configured of servo signals continuously aligned in the longitudinal direction of the magnetic tape. A plurality of the servo bands are generally provided in the magnetic tape. For example, in an LTO tape, the number of servo bands is five. A region sandwiched between the adjacent two servo bands is referred to as a data band. The data band is configured of a plurality of data tracks, and data tracks corresponds to respective servo tracks.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

A head for forming a servo pattern is referred to as a servo write head. The servo write head has the same number of pairs of gaps corresponding to the respective pairs of magnetic stripes as the number of servo bands. Generally, a core and a coil are connected to each pair of gaps, and a magnetic field generated in the core by suppling a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 µm or less, 1 to 10 µm, or 10 µm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

Composition for Magnetic Recording Medium

One aspect of the invention relates to a composition for a magnetic recording medium including a ferromagnetic powder, and a compound including a polyalkyleneimine chain and a vinyl polymer chain. The details of such a composition for a magnetic recording medium are as described regarding the magnetic recording medium according to one aspect of the invention and the composition for a magnetic layer used for forming the same.

The composition for a magnetic recording medium may be a one pack type composition in which all components are mixed with each other, or may be a multi-liquid composition which is two or more pack type used by mixing a plurality of liquids for forming a magnetic layer.

The magnetic recording medium according to one aspect of the invention described above can achieve both the improvement of electromagnetic conversion characteristics and the improvement of durability. In addition, the composition for a magnetic recording medium according to one aspect of the invention can be used as the magnetic layer forming composition of such a magnetic recording medium.

Magnetic Recording and Reproducing Device

One aspect of the invention relates to a magnetic recording and reproducing device including the above magnetic tape and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type device is a device in which the surface of the magnetic layer and the magnetic head are in contact with each other and slide, in a case of performing recording of data on the magnetic recording medium and/or reproducing of the recorded data.

The magnetic head included in the magnetic recording and reproducing device may be a recording head capable of recording data on a magnetic recording medium, and can also be a reproducing head capable of reproducing data recorded on the magnetic recording medium. In addition, in one aspect, the magnetic recording and reproducing device can include both of a recording head and a reproducing head as separate magnetic heads. In another aspect, the magnetic head included in the magnetic recording and reproducing device can has a configuration where both of an element for recording data (recording element) and an element for reproducing data (reproducing element) are included in one magnetic head. Hereinafter, an element for recording data and an element for reproducing data are collectively referred to as "(an) element(s) for data". As the reproducing head, a magnetic head (MR head) including, as the reproducing element, a magnetoresistive (MR) element capable of reading data recorded on the magnetic recording medium with excellent sensitivity is preferable. As the MR head, various known MR heads such as an anisotropic magnetoresistive (AMR) head, a giant magnetoresistive (GMR) head, and a tunnel magnetoresistive (TMR) head may be used. In addition, the magnetic head which records data and/or reproduces data may include a servo pattern reading element. Alternatively, as a head other than the magnetic head which records data and/or reproduces data, a magnetic head (servo head) including a servo signal reading element may be included in the magnetic recording and reproducing device. For example, the magnetic head (hereinafter, also referred to as "recording and reproducing head") which records data and/or reproduces data may include two servo signal reading elements, and each of the two servo signal reading elements can read adjacent two servo bands at the same time. One or a plurality of data elements may be disposed between two servo signal reading elements.

In the magnetic recording and reproducing device, the recording of data on the magnetic recording medium and the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to one aspect of the invention, and well-known technologies can be applied for the other configurations.

For example, when recording and/or reproducing data, a tracking using a servo signal, which has been yielded by reading a servo pattern, is firstly performed. That is, an element for data is controlled to pass over data track of interest by causing a servo signal reading element to follow a predetermined data track. The movement of the data track is performed by shifting the servo track read by the servo signal reading element in the width direction of a tape.

The recording and reproducing head can record on and/or reproduce from other data bands. At that time, the servo signal reading element may be moved to a predetermined servo band utilizing the above-described UDIM information, and tracking of the servo band may be started.

EXAMPLES

Hereinafter, the invention will be described with reference to examples in details. However, the invention is not limited to aspects shown in the examples. "Parts" and "%" in the following description are based on mass, unless otherwise noted. "eq" in the following description indicates equivalent and SI unit is a unit not convertible. In addition, each step and each operation were performed under atmospheric pressure at a room temperature (atmosphere temperature of 20° C. to 25° C.).

The weight-average molecular weight and the number average molecular weight shown below are values obtained as polystyrene-converted values measured by GPC under the measurement conditions described above. In addition, the amine value shown below is value obtained by the measurement method described above.

The introduction of each synthesis raw material to the compound finally synthesized at a ratio calculated from the used amount was confirmed with a measurement value of $^1$H-nuclear magnetic resonance (NMR), the weight-average molecular weight, and the amine value.

The glass transition temperatures Tg of the intermediate and the compound are values obtained by dynamic viscoelasticity measurement described hereinafter.

The glass transition temperature (Tg) was obtained from an inflection point in a case where approximately 6 mg of a sample obtained by collecting a part of a reaction solution after synthesis and causing vacuum drying and a sample obtained by causing vacuum drying after reprecipitation was weighed on an aluminum pan using a chemical balance capable of weighing a unit of 0.01 mg, and this aluminum pan was set on a DSC measurement holder and heated to 10° C. to 300° C. at 2° C./min, by using differential scanning calorimetry (DSC) Q2000 manufactured by TA Instruments. This sample was obtained as powder sample, and a particle size of the particles configuring the powder was equal to or smaller than 0.5 mm.

The abbreviations below respectively indicate terms below.

MPA: Mercaptopropionic acid
MGA: thioglycolic acid
MMA: methyl methacrylate
St: Styrene
BzMA: benzyl methacrylate
IBOMA: isobornyl methacrylate
HEMA: 2-hydroxyethyl methacrylate
PrMA: n-propyl methacrylate
LMA: Lauryl methacrylate
EHMA: 2-ethylhexyl methacrylate
EHA: 2-ethylhexyl acrylate
BMA: n-butyl acrylate
PGMEA: Propylene glycol monomethyl ether acetate
V-601: Dimethyl 2,2'-azobis (2-methylpropionate) (manufactured by Wako Pure Chemical Corporation)
SP-006: polyethyleneimine SP-006 manufactured by Nippon Shokubai Co., Ltd., number average molecular weight of 600
SP-003: polyethyleneimine SP-003 manufactured by Nippon Shokubai Co., Ltd., number average molecular weight of 300
SP-012: polyethyleneimine SP-012 manufactured by Nippon Shokubai Co., Ltd., number average molecular weight of 1,200
SP-018: polyethyleneimine SP-018 manufactured by Nippon Shokubai Co., Ltd., number average molecular weight of 1,800
SP-200: polyethyleneimine SP-200 manufactured by Nippon Shokubai Co., Ltd., number average molecular weight of 10,000

Synthesis of Compound Q-1

Synthesis of Intermediate P-1

45.0 g of PGMEA (reaction solvent) was added to 500 mL three-neck flask under the nitrogen atmosphere. After increasing the liquid temperature to 75° C., 6.4 g of MPA (thiol compound), 90.1 g of MMA (vinyl monomer), 180.1 g of PGMEA (reaction solvent), and 0.14 g of V-601 (polymerization initiator) were mixed with each other in advance and added dropwise for 2 hours. After the dropwise addition, 0.14 g of V-601 was added and stirred for 2 hours. In addition, the liquid temperature was increased to 90° C., and the mixture was stirred for 2 hours to obtain a PGMEA solution of the intermediate P-1. In Table 1 shown below, the mol number disclosed regarding the vinyl monomer indicates the mol number with respect to 1 mol of the thiol compound used in the synthesis of the intermediate.

Synthesis of Compound Q-1

4.8 g of polyethyleneimine (SP-006 manufactured by Nippon Shokubai Co., Ltd.) and 144.8 g of the 50% PGMEA solution of the intermediate P-1 were mixed with each other and heated to the liquid temperature of 110° C. for 3 hours, and accordingly, a compound Q-1 (random Copolymer) was obtained.

The above synthesis scheme is shown below. In the following synthesis scheme, a, b, and c each independently represent a polymerization molar ratio of a repeating unit, are 0 to 50, and a+b+c=100. k1, 1, m1, and m2 each independently represent a polymerization molar ratio of a repeating unit, k is 10 to 90, 1 is 0 to 80, m1 and m2 are each independently 0 to 70, and k+1+m1+m2=100. n represents a repeating unit and is 2 to 100.

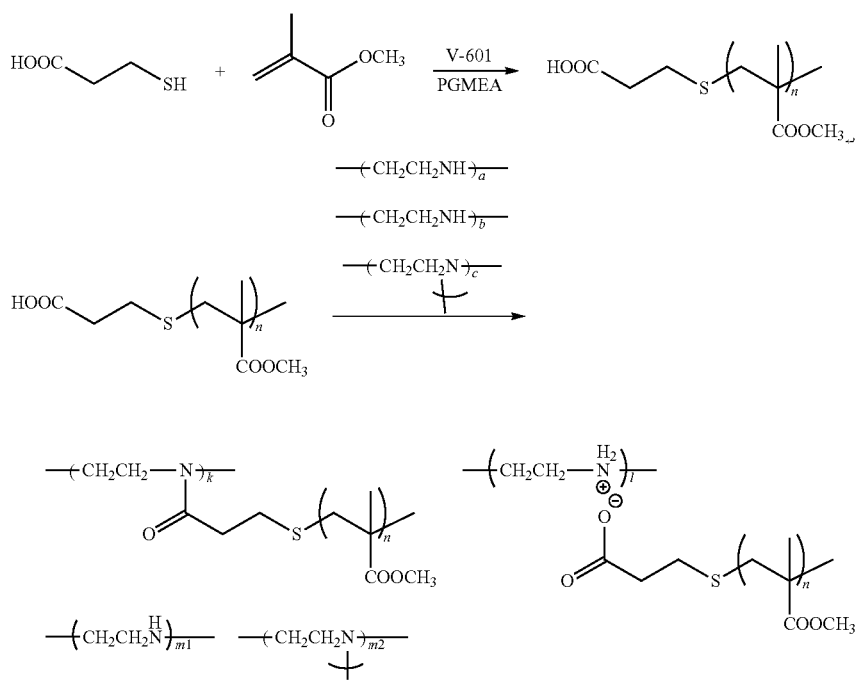

Synthesis of Compounds Q-2 to Q-29

Synthesis of Intermediate P-2 to P-18

Intermediates P-2 to P-18 were respectively synthesized by the same method as that in the synthesis of the intermediate P-1, except that the vinyl monomer and the thiol compound shown in Table 1 below were used for synthesis of the intermediate.

Synthesis of Compounds Q-2 to Q-29

Compounds Q-2 to Q-29 (random copolymer) were respectively synthesized by the same method as that in the synthesis of the compound Q-1, except that the used amount of polyethyleneimine and the kind and used amount of the intermediate were changed as shown in Table 3.

Synthesis of Acid-Modified Compound 30 to 33

The acid anhydride shown in Table 4 was added by the mol number shown in Table 4 per 1 mol of the compound shown in Table 4 and the acid-modified compound shown in Table 4 was synthesized. Specifically, the 30% PGMEA solution of the compound shown in Table 4 was heated to liquid temperature of 70° C., the acid anhydride was added and stirred for 1 hour, and accordingly, the acid-modified compound Q-30 to 33 were synthesized. By the acid modification described above, in the acid-modified compounds Q-30 to Q-32, one partial structure represented by Formula 4 is introduced to 1 molecule and, in the acid-modified compound Q-33, two partial structures are introduced to 1 molecule.

TABLE 2

Structure of Intermediate

| intermediate | structure |
|---|---|
| P-1 | HOOC~~S—* *—(—)$_7$—* / COOCH$_3$ |
| P-2 | HOOC~~S—* *—(—)$_{15}$—* / COOCH$_3$ |
| P-3 | HOOC~~S—* *—(—)$_{30}$—* / COOCH$_3$ |
| P-4 | HOOC~~S—* *—(—)$_{60}$—* / COOCH$_3$ |
| P-5 | HOOC~S—* *—(—)$_{30}$—* / COOCH$_3$ |

TABLE 1

Synthesis of Intermediate

| Intermediate | Thiol compound | Vinyl monomer 1 Kind | Vinyl monomer 1 Mol number | Vinyl monomer 2 Kind | Vinyl monomer 2 Mol number | Vinyl monomer 3 Kind | Vinyl monomer 3 Mol number | Tg (° C.) | Weight-average molecular weight |
|---|---|---|---|---|---|---|---|---|---|
| P-1 | MPA | MMA | 7 | | | | | 100 | 1,700 |
| P-2 | MPA | MMA | 15 | | | | | 105 | 3,500 |
| P-3 | MPA | MMA | 30 | | | | | 105 | 6,200 |
| P-4 | MPA | MMA | 60 | | | | | 105 | 11,100 |
| P-5 | MGA | MMA | 30 | | | | | 105 | 6,500 |
| P-6 | MPA | MMA | 15 | St | 15 | | | 98 | 7,000 |
| P-7 | MPA | MMA | 45 | St | 15 | | | 99 | 12,500 |
| P-8 | MGA | MMA | 15 | St | 15 | | | 98 | 7,300 |
| P-9 | MPA | MMA | 35 | LMA | 5 | | | 80 | 6,900 |
| P-10 | MPA | MMA | 15 | EHMA | 15 | | | 73 | 6,900 |
| P-11 | MPA | MMA | 15 | EHA | 5 | | | 59 | 5,100 |
| P-12 | MPA | MMA | 15 | BMA | 35 | | | 52 | 9,700 |
| P-13 | MPA | BzMA | 30 | | | | | 54 | 6,500 |
| P-14 | MPA | MMA | 30 | IBOMA | 10 | | | 115 | 4,800 |
| P-15 | MPA | MMA | 10 | IBOMA | 5 | HEMA | 5 | 106 | 5,200 |
| P-16 | MPA | MMA | 25 | IBOMA | 10 | HEMA | 5 | 111 | 5,200 |
| P-17 | MPA | IBOMA | 30 | | | | | 172 | 6,900 |
| P-18 | MPA | PrMA | 40 | | | | | 35 | 6,300 |

TABLE 2-continued
Structure of Intermediate
| intermediate | structure |
|---|---|
| P-6 | 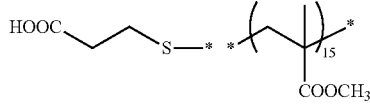 |
| P-7 | 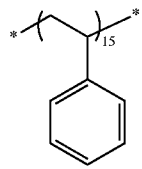 |
| P-8 | 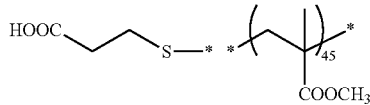 |
| P-9 | 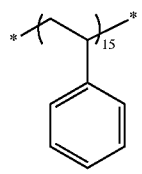 |
| P-10 | 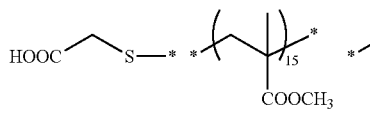 |
| P-11 |  |
| P-12 | 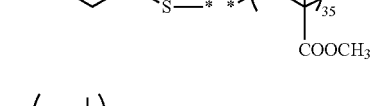 |
| P-13 | 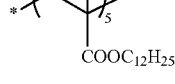 |
| P-14 | 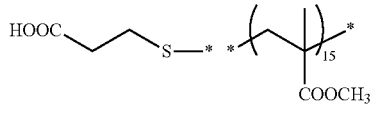 |
| P-15 | 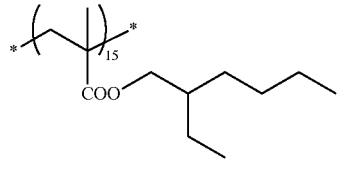 |

TABLE 2-continued

Structure of Intermediate

| intermediate | structure |
|---|---|
| P-16 | HOOC-CH₂CH₂-S-*  *-(CH₂-CH(COOCH₃))₂₅-*   *-(CH₂-CH(COO-norbornyl))₁₀-*   *-(CH₂-CH(COO-CH₂CH₂-OH))₅-* |
| P-17 | HOOC-CH₂CH₂-S-*  *-(CH₂-CH(COO-isobornyl))₃₀-* |
| P-18 | HOOC-CH₂CH₂-S-*  *-(CH₂-CH(COO-propyl))₄₀-* |

TABLE 3

Synthesis of Compound and Physical Properties of Compound

| | Polyalkyleneimine | | 50% PGMEA solution of intermediate (g) | | Mol number of functional group capable of reacting with amino group included in intermediate with respect to 1 mol of amino group of polyalkyleneimine (mol) | Physical properties of compound | | |
|---|---|---|---|---|---|---|---|---|
| Compound | Kind | (g) | Kind | Used amount of 50% PGMEA solution (g) | | Weight-average molecular weight | Amine value (mmol/g) | Tg (° C.) |
| Q-1 | SP-006 | 4.8 | P-1 | 144.8 | 0.81 | 2,100 | 0.67 | 100 |
| Q-2 | SP-006 | 2.4 | P-2 | 144.8 | 0.81 | 4,100 | 0.35 | 105 |
| Q-3 | SP-006 | 1.2 | P-3 | 144.8 | 0.84 | 7,300 | 0.28 | 105 |
| Q-4 | SP-006 | 0.6 | P-4 | 144.8 | 0.85 | 12,200 | 0.24 | 105 |
| Q-5 | SP-006 | 1.2 | P-5 | 144.8 | 0.84 | 7,100 | 0.34 | 105 |
| Q-6 | SP-006 | 1.2 | P-6 | 144.8 | 0.82 | 7,900 | 0.36 | 90 |
| Q-7 | SP-006 | 1.2 | P-7 | 144.8 | 0.42 | 16,300 | 0.85 | 90 |
| Q-8 | SP-006 | 1.2 | P-8 | 144.8 | 0.82 | 8,100 | 0.25 | 90 |
| Q-9 | SP-006 | 1.2 | P-9 | 144.8 | 0.53 | 7,200 | 0.46 | 80 |
| Q-10 | SP-006 | 1.2 | P-10 | 144.8 | 0.57 | 7,200 | 0.45 | 70 |
| Q-11 | SP-006 | 1.2 | P-11 | 144.8 | 1.03 | 5,500 | 0.21 | 55 |
| Q-12 | SP-006 | 0.6 | P-12 | 144.8 | 0.79 | 10,100 | 0.68 | 50 |
| Q-13 | SP-006 | 1.2 | P-13 | 144.8 | 0.48 | 6,800 | 0.48 | 50 |
| Q-14 | SP-006 | 1.2 | P-14 | 144.8 | 0.49 | 5,400 | 0.49 | 110 |
| Q-15 | SP-006 | 1.2 | P-15 | 144.8 | 0.91 | 5,800 | 0.22 | 100 |
| Q-16 | SP-006 | 1.2 | P-16 | 144.8 | 0.47 | 6,000 | 0.83 | 110 |
| Q-17 | SP-006 | 2.0 | P-2 | 144.8 | 0.97 | 4,800 | 0.33 | 105 |
| Q-18 | SP-006 | 3.6 | P-2 | 144.8 | 0.54 | 3,900 | 0.47 | 100 |
| Q-19 | SP-006 | 6.0 | P-2 | 144.8 | 0.32 | 3,600 | 0.88 | 100 |
| Q-20 | SP-006 | 9.6 | P-2 | 144.8 | 0.20 | 3,200 | 1.01 | 100 |
| Q-21 | SP-006 | 0.6 | P-13 | 144.8 | 0.96 | 6,800 | 0.32 | 50 |
| Q-22 | SP-003 | 0.6 | P-4 | 144.8 | 0.85 | 8,300 | 0.38 | 105 |
| Q-23 | SP-003 | 1.2 | P-7 | 144.8 | 0.42 | 9,300 | 0.82 | 95 |
| Q-24 | SP-012 | 1.2 | P-11 | 144.8 | 1.03 | 8,200 | 0.25 | 55 |
| Q-25 | SP-018 | 2.0 | P-2 | 144.8 | 0.62 | 5,300 | 0.15 | 100 |
| Q-26 | SP-006 | 6.0 | P-4 | 144.8 | 0.21 | 11,300 | 1.56 | 90 |
| Q-27 | SP-018 | 4.2 | P-7 | 144.8 | 0.29 | 32,000 | 1.02 | 100 |
| Q-28 | SP-200 | 2.0 | P-17 | 144.8 | 0.62 | 42,000 | 0.54 | 170 |
| Q-29 | SP-006 | 3.0 | P-18 | 144.8 | 0.41 | 8,200 | 0.48 | 30 |

TABLE 4

Synthesis of Acid-Modified Compound and Physical Properties of Acid-Modified Compound

| Acid-modified compound | Compound before modification | Acid anhydride Kind | Added amount (mol) | Weight-average molecular weight | Amine value (mmol/g) | Tg (° C.) |
|---|---|---|---|---|---|---|
| Q-30 | Q-2 | Phthalic acid anhydride | 0.05 | 4,300 | 0.30 | 100 |
| Q-31 | Q-4 | Succinic acid anhydride | 0.03 | 12,600 | 0.20 | 100 |
| Q-32 | Q-12 | Phthalic acid anhydride | 0.05 | 10,300 | 0.76 | 55 |
| Q-33 | Q-24 | Succinic acid anhydride | 0.03 | 8,400 | 0.21 | 55 |

Synthesis of Comparative Compound 1

Synthesis of Comparative Intermediate 1

6.3 g of n-octanoic acid (manufactured by Wako Pure Chemical Corporation) as carboxylic acid, 50 g of ε-caprolactone (PLACCEL M manufactured by Daicel Corporation) as lactone, and 1.1 g of monobutyltin oxide (ring-opening polymerization catalyst) ($C_4H_9Sn(O)OH$) were mixed with each other in 500 mL three-neck flask under the nitrogen atmosphere, heated to a liquid temperature of 160° C., and stirred for 1 hour. 50 g of ε-caprolactone was added dropwise to the reaction solution for 5 hours and further stirred for 2 hours. After that, the liquid temperature was 70° C., 248.0 g of the PGMEA (solvent) was added, and 50% PGMEA solution of a comparative intermediate 1 was obtained. The used amount (mol number) of caprolactone with respect to 1 mol of octanoic acid is 20 mol. The glass transition temperature Tg of the comparative intermediate 1 was −60° C. and the weight-average molecular weight was 8,200.

Synthesis of Comparative Compound 1

4.8 g of polyethyleneimine (SP-018 manufactured by Nippon Shokubai Co., Ltd.) and 70 g of the 50% PGMEA solution of the comparative intermediate 1 were mixed with each other and heated to the liquid temperature of 110° C. for 3 hours, and a comparative compound 1 was obtained. The comparative compound 1 is a compound which includes a polyalkyleneimine chain and does not include a vinyl polymer chain. Regarding the comparative compound 1, the glass transition temperature was 100° C., the weight-average molecular weight was 8,900, and the amine value was 0.89 mmol/g.

Manufacturing of Magnetic Recording Medium

Example 1

List of Magnetic Layer Forming Composition
Ferromagnetic powder (see Table 5): 100.0 parts
Compound shown in Table 5: 33.3 parts (amount of reaction solution obtained after synthesis of the compound; 10.0 parts as the amount of the compound shown in Table 5)
Polyurethane resin: (VYLON (registered trademark) UR4800 manufactured by Toyobo Co., Ltd., functional group: $SO_3Na$, functional group concentration: 70 eq/ton): 5.0 parts
Vinyl chloride resin (MR 104 manufactured by Kaneka Corporation): 10.0 parts
Methyl ethyl ketone: 150.0 parts
Cyclohexanone: 150.0 parts
α-$Al_2O_3$ (average particle size of 0.1 μm): 8.0 parts
Carbon black (average particle size of 20 nm): 0.5 parts Preparation of Magnetic Layer Forming Composition The components described above were kneaded with an open kneader and dispersed using a sand mill. The following components were added to the obtained dispersion liquid and stirred, subjected to ultrasonic treatment, and filtered using a filter having an average hole diameter of 1 μm, and a magnetic layer forming composition was prepared.
Butyl stearate: 2.0 parts
Stearic acid: 0.5 parts
Methyl ethyl ketone: 50.0 parts
Cyclohexanone: 50.0 parts
Toluene: 3.0 parts
Polyisocyanate compound (CORONATE 3041 manufactured by Tosoh Corporation): 5.0 parts
List of Non-Magnetic Layer Forming Composition
Carbon black: 100.0 parts
  Dibutyl phthalate (DBP) oil absorption amount: 100 ml/100 g
  ph: 8
  BET specific surface area: 250 $m^2$/g
  volatile content: 1.5%
Polyurethane resin (VYLON UR4800 manufactured by Toyobo Co., Ltd., functional group: $SO_3Na$, functional group concentration: 70 eq/ton): 20.0 parts
Vinyl chloride resin (functional group: $OSO_3K$, functional group concentration: 70 eq/ton): 30.0 parts
Trioctyl amine: 4.0 parts
Cyclohexanone: 140.0 parts
Methyl ethyl ketone: 170.0 parts
Butyl stearate: 2.0 parts
Stearic acid: 2.0 parts
Stearic acid amide: 0.1 parts Preparation of Non-Magnetic Layer Forming Composition The components described above were kneaded with an open kneader and dispersed using a sand mill. The following components were added to the obtained dispersion liquid and stirred, and filtered using a filter having an average hole diameter of 1 and a non-magnetic layer forming composition was prepared.

Butyl stearate: 1.5 parts
Stearic acid: 1.0 parts
Methyl ethyl ketone: 50.0 parts
Cyclohexanone: 50.0 parts
Toluene: 3.0 parts
Polyisocyanate compound (CORONATE 3041 manufactured by Tosoh Corporation): 5.0 parts
List of Back Coating Layer Forming Composition
Carbon black (average particle size of 40 nm): 85.0 parts
Carbon black (average particle size of 100 nm): 3.0 parts
Nitrocellulose: 28.0 parts
Polyurethane resin: 58.0 parts
Copper phthalocyanine-based dispersant: 2.5 parts
NIPPOLAN 2301 (manufactured by Tosoh Corporation): 0.5 parts
Methyl isobutyl ketone: 0.3 parts
Methyl ethyl ketone: 860.0 parts
Toluene: 240.0 parts Preparation of Back Coating Layer Forming Composition The components described above were preliminarily kneaded with a roll mill and dispersed using a sand mill. 4.0 parts of a polyester resin (VYLON 500 manufactured by Toyobo Co., Ltd.), 14.0 parts of a polyisocyanate compound (CORONATE 3041 manufactured by Tosoh Corporation), and 5.0 parts of $\alpha$-$Al_2O_3$ (manufactured by Sumitomo Chemical Co., Ltd.) were added to the obtained dispersion liquid, stirred, and filtered, and a back coating layer forming composition was prepared.

Manufacturing of Magnetic Recording Medium

A corona discharge treatment was performed on both surfaces of a polyethylene naphthalate support having a thickness of 5.0 μm.

The non-magnetic layer forming composition was applied onto one surface of the polyethylene naphthalate support so that a thickness of the non-magnetic layer after the drying becomes 1.0 μm, and immediately after that, the magnetic layer forming composition was applied thereon at the same time so that a thickness of the magnetic layer after the drying becomes 100 nm. While both layers were in a wet state, a homeotropic alignment process was performed by cobalt magnet having a magnetic force of 0.5 T (5,000 G) and solenoid having a magnetic force of 0.4 T (4,000 G), and then, the drying process was performed. Then, the back coating layer forming composition was applied onto the other surface of the polyethylene naphthalate support so that a thickness of the back coating layer after the drying becomes 0.5 μm, and a calender process was performed with a seven-stage calender configured with a metal roll at a surface temperature of the calender roll of 100° C. at a rate of 80 m/min. After that, the slitting was performed to have a width of ½ inches (0.0127 meters), and a magnetic tape was manufactured.

Examples 2 to 33

A magnetic tape was manufactured by the same method as that in Example 1, except that the compound shown in Table 5 was used instead of the compound Q-1.

Examples 34 to 78

A magnetic tape was manufactured by the same method as that in Example 1, except that the compound shown in Table 5 was used instead of the compound Q-1 and that the ferromagnetic powder shown in Table 5 was used instead of the hexagonal ferrite barium powder.

Comparative Example 1

A magnetic tape was manufactured by the same method as that in Example 1, except that the comparative compound 1 was used instead of the compound Q-1.

Comparative Example 2

A magnetic tape was manufactured by the same method as that in Example 1, except that the intermediate P-3 was used as the comparative compound 2 instead of the compound Q-1.

In Table 5, "BaFe" is the following hexagonal barium ferrite powder.

Composition excluding oxygen (molar ratio): Ba/Fe/Co/Ti=1/11.7/0.2/0.1
Coercivity Hc: 183 kA/m (2,300 Oe)
Average particle size (average plate diameter): 20 nm
Average plate ratio: 4.0
Brunauer-Emmett-Teller (BET) specific surface area: 100 $m^2$/g
Saturated magnetization: 43 A·$m^2$/kg (43 emu/g)

In Table 5, "SrFe1" is the hexagonal strontium ferrite powder prepared by the following method.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to 635° C. (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar and subjected to a dispersion process with a paint shaker for 3 hours, by adding 1,000 g of zirconia beads having a particle diameter of 1 mm and 800 ml of acetic acid having a concentration of 1% in a glass bottle. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

The hexagonal strontium ferrite powder obtained above had an average particle size of 18 nm, an activation volume of 902 $nm^3$, an anisotropy constant of 2.2×$10^5$ J/$m^3$, and a mass magnetization us of 49 A·$m^2$/kg.

12 mg of sample powder was collected from the hexagonal strontium ferrite powder obtained above, element analysis of filtrate obtained by partially dissolving the sample powder under the dissolving conditions exemplified above was performed by the ICP analysis device, and the surface portion content of neodymium atom was obtained.

Separately, 12 mg of sample powder was collected from the hexagonal strontium ferrite powder obtained above, element analysis of filtrate obtained by totally dissolving the sample powder under the dissolving conditions exemplified above was performed by the ICP analysis device, and the surface portion content of neodymium atom was obtained.

In the hexagonal strontium ferrite powder, the content (bulk content) of neodymium atom with respect to 100 atom % of iron atom was 2.9 atom %, and the surface portion content of neodymium atom was 8.0 atom %. The "surface portion content/bulk content", that is a ratio of the surface portion content to the bulk content, was 2.8. It was confirmed that the neodymium atom was unevenly distributed in the surface portion of the particles.

The X-ray diffraction analysis of the powder obtained above was performed by scanning with a CuKα, ray at a voltage of 45 kV and intensity of 40 mA and by measuring X-ray diffraction pattern under the conditions. By the X-ray diffraction analysis, it was confirmed that the powder obtained above showed the crystal structure of hexagonal ferrite. The powder obtained above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: 1/4 degrees
Mask: 10 mm
Scattering prevention slit: 1/4 degrees
Measurement mode: continuous
Measurement time per 1 stage: 3 seconds
Measurement speed: 0.017 degrees per second
Measurement step: 0.05 degrees In Table 5, "SrFe2" is the hexagonal strontium ferrite powder prepared by the following method.

At first, 1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed, and were then mixed with a mixer to obtain a raw material mixture.

The obtained raw material mixture was dissolved in a platinum crucible at a melting temperature of 1380° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

Then, 280 g of the obtained amorphous material was placed in an electric furnace, the temperature in the electric furnace was raised to 645° C. (crystallization temperature), and the amorphous material was still stood in the electric furnace for 5 hours at the same temperature, to precipitate (crystalize) hexagonal strontium ferrite particles.

Subsequently, the above-obtained crystal containing hexagonal strontium ferrite particles was roughly ground in a mortar, and the ground crystals was put in a glass bottle, together with 1000 g of zirconia beads having a particle diameter of 1 mm and 800 ml of acetic acid having a concentration of 1% and were subjected to a dispersion treatment for 3 hours with a paint shaker. Thereafter, the obtained dispersion was separated from the beads and put in a stainless beaker. The dispersion was stood still at a liquid temperature of 100° C. for 3 hours to dissolve a glass component, and thereafter centrifuged in a centrifugal separator to precipitation and were repeatedly decanted to wash the precipitated matter and the precipitated matter is dried in a furnace at an in-furnace temperature of 110° C. for 6 hours, to obtain hexagonal strontium ferrite powder.

The obtained hexagonal strontium ferrite powder had an average particle size of 19 nm, an activation volume of 1102 $nm^3$, an anisotropy constant Ku of $2.0 \times 10^5$ $J/m^3$, and a mass magnetization os of 50 $Am^2/kg$.

In Table 5, "ε-iron oxide" is the ε-iron oxide powder prepared by the following method.

A solution was prepared by dissolving 8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) in 90 g of pure water. While stirring the solution using a magnetic stirrer, 4.0 g of aqueous ammonia solution having a concentration of 25% was then added to the solution in the atmosphere under a condition of an ambient temperature of 25° C. and stirred for subsequent 2 hours under the same ambient temperature of 25° C. A citric acid solution, which was obtained by dissolving 1 g of citric acid in 9 g of pure water, was added to the obtained solution, and the obtained mixture was then stirred for 1 hour. Powder precipitated after the stirring was collected by centrifugal separation, washed with pure water, and dried in a furnace at an in-furnace temperature of 80° C.

To the dried powder, 800 g of pure water was added to disperse the powder in water again for preparing a dispersion. The obtained dispersion was heated at a liquid temperature of 50° C., and 40 g of aqueous ammonia solution having a concentration of 25% was added dropwise thereto while stirring the dispersion. The dispersion was stirred for 1 hour while maintaining the liquid temperature at 50° C., and 14 mL of tetraethoxysilane (TEOS) was then added dropwise to the dispersion, and the obtained mixture was then stirred for 24 hours. To the obtained reaction solution, 50 g of ammonium sulfate was added, and precipitated powder was then collected by centrifugal separation, washed with pure water, and dried in a furnace at an in-furnace temperature of 80° C., to obtain a ferromagnetic powder precursor.

The obtained ferromagnetic powder precursor was put in a furnace at an in-furnace temperature of 1000° C. in the atmosphere and heat-treated for 4 hours.

The heat-treated ferromagnetic powder precursor was introduced into a 4 mol/L aqueous sodium hydroxide (NaOH) solution, and then stirred for 24 hours while maintaining a liquid temperature at 70° C. to remove impurity silicate compound from the ferromagnetic powder precursor subjected to the heat treatment.

Thereafter, the ferromagnetic powder from which a silicate compound has been removed was collected by a centrifugal separation and washed with pure water, to obtain ferromagnetic powder.

The composition of the obtained ferromagnetic powder was analyzed by inductively coupled plasma-optical emission spectrometry (ICP-OES) and was found to be Ga, Co, and Ti substitution-type ε-iron oxide (ε-$Ga_{0.58}Fe_{1.42}O_3$). Moreover, the obtained ferromagnetic powder was analyzed by X-ray diffraction analysis under the same conditions as described for SrFeI above, and it was confirmed from peaks in the X-ray diffraction pattern that the obtained ferromagnetic powder did not have crystal structures of α phase and γ phase and had a single crystal structure of α phase (ε-iron oxide type crystal structure).

The obtained ε-iron oxide powder had an average particle size of 12 nm, an activation volume of 746 nm$^3$, an anisotropy constant Ku of 1.2×10$^5$ J/m$^3$, and a mass magnetization σs of 16 A·m$^2$/kg.

The activation volume and anisotropy constant Ku of each of the hexagonal strontium ferrite powder and the ε-iron oxide powder were values determined by the above-described method using a vibrating sample magnetometer (manufactured by Toei Industry Co., Ltd.).

Moreover, the mass magnetization σs is a value measured using a vibrating sample magnetometer (manufactured by Toei Industry Co., Ltd.) at a magnetic field strength of 15 kOe.

Evaluation of Magnetic Recording Medium

Electromagnetic Conversion Characteristics: Signal-to-Noise Ratio (SN Ratio)

Signals having a linear recording density of 172 kfci and 86 kfci was recorded using a linear-tape-open (LTO)-Generation 4 (Gen4) drive by setting a recording track width f 11.5 µm and a reproduction track width of 5.3 µm, the reproduced signal was frequency-analyzed with a spectrum analyzer, and a ratio of output of a carrier signal in a case of 172 kfci signal recording and integral noise in all spectra band in a case of 86 kfci signal recording was set as an S/N ratio. The S/N ratio of Comparative Example 2 was set as 0 dB as a reference value, and the S/N ratio of each magnetic tape was shown as a relative value. In a case where the S/N ratio is greater than 0 dB, it is possible to determine that good electromagnetic conversion characteristics are obtained as a magnetic recording medium for high-density recording, in a case where the S/N ratio is equal to or greater than 0.5 dB, it is possible to determine that excellent electromagnetic conversion characteristics are obtained as a magnetic recording medium for high-density recording, and in a case where the S/N ratio is 1.0 dB, it is possible to determine that particularly excellent electromagnetic conversion characteristics are obtained as a magnetic recording medium for high-density recording.

Durability of Magnetic Recording Medium (Scratch of Surface of Magnetic Layer)

A magnetic tape was transferred with an angle of 150 degrees so that the surface of the magnetic layer is in contact with an edge of a square column bar having a cross section of 7 mm×7 mm made of Al$_2$O$_3$/TiC, the magnetic tape having a length of 100 m was slid for 1 pass under the conditions of a load of 100 g and a speed per second of 6 m, the edge of the square column bar was observed with an optical microscope, and an attachment state of contamination was evaluated. The evaluation was a function evaluation and a 10-stage evaluation. A level 10 indicates the smallest amount of contamination and a level 1 indicates the greatest amount of contamination.

The contamination evaluated by the method described above are mainly generated due to scratch of the surface of the magnetic layer, and a small value of the evaluation result means the scratch of the surface of the magnetic layer and a low durability of the magnetic recording medium. In a case where the evaluation value is equal to or greater than 5, it is possible to determine that the amount of contamination (scratch of the surface of the magnetic layer) is small and the durability of the magnetic recording medium is good, in a case where the evaluation result is equal to or greater than 7, it is possible to determine that the durability is excellent, and in a case where the evaluation result is equal to or greater than 8, it is possible to determine that the durability is particularly excellent.

The result described above is shown in Table 5 below with values of physical properties of each compound described above.

TABLE 5

Result of Evaluation of Magnetic Recording Medium

| | Compound | | | | | Result of evaluation of magnetic recording medium | |
|---|---|---|---|---|---|---|---|
| | Ferromagnetic powder | Kind | Weight-average molecular weight | Amine value (mmol/g) | Tg (° C.) | S/N ratio (dB) | Durability (poor) 1 to 10 (good) |
| Example 1 | BaFe | Q-1 | 2,100 | 0.67 | 100 | 2.0 | 9 |
| Example 2 | BaFe | Q-2 | 4,100 | 0.35 | 105 | 1.5 | 10 |
| Example 3 | BaFe | Q-3 | 7,300 | 0.28 | 105 | 1.5 | 10 |
| Example 4 | BaFe | Q-4 | 12,200 | 0.24 | 105 | 1.0 | 10 |
| Example 5 | BaFe | Q-5 | 7,100 | 0.34 | 105 | 1.5 | 10 |
| Example 6 | BaFe | Q-6 | 7,900 | 0.36 | 90 | 1.5 | 10 |
| Example 7 | BaFe | Q-7 | 16,300 | 0.85 | 90 | 1.0 | 10 |
| Example 8 | BaFe | Q-8 | 8,100 | 0.25 | 90 | 1.5 | 10 |
| Example 9 | BaFe | Q-9 | 7,200 | 0.46 | 80 | 1.5 | 9 |
| Example 10 | BaFe | Q-10 | 7,200 | 0.45 | 70 | 1.5 | 9 |
| Example 11 | BaFe | Q-11 | 5,500 | 0.21 | 55 | 1.5 | 8 |
| Example 12 | BaFe | Q-12 | 10,100 | 0.68 | 50 | 1.0 | 8 |
| Example 13 | BaFe | Q-13 | 6,800 | 0.48 | 50 | 1.5 | 8 |
| Example 14 | BaFe | Q-14 | 5,400 | 0.49 | 110 | 1.0 | 10 |
| Example 15 | BaFe | Q-15 | 5,800 | 0.22 | 100 | 1.5 | 10 |
| Example 16 | BaFe | Q-16 | 6,000 | 0.83 | 110 | 1.0 | 10 |
| Example 17 | BaFe | Q-17 | 4,800 | 0.33 | 105 | 1.5 | 10 |
| Example 18 | BaFe | Q-18 | 3,900 | 0.47 | 100 | 1.5 | 10 |
| Example 19 | BaFe | Q-19 | 3,600 | 0.88 | 100 | 1.0 | 9 |
| Example 20 | BaFe | Q-20 | 3,200 | 1.01 | 100 | 1.0 | 9 |
| Example 21 | BaFe | Q-21 | 6,800 | 0.32 | 50 | 1.8 | 9 |
| Example 22 | BaFe | Q-22 | 8,300 | 0.38 | 105 | 1.5 | 10 |
| Example 23 | BaFe | Q-23 | 9,300 | 0.82 | 95 | 1.5 | 10 |
| Example 24 | BaFe | Q-24 | 8,200 | 0.25 | 55 | 1.0 | 8 |
| Example 25 | BaFe | Q-25 | 5,300 | 0.15 | 100 | 0.5 | 9 |
| Example 26 | BaFe | Q-26 | 11,300 | 1.48 | 90 | 0.5 | 7 |
| Example 27 | BaFe | Q-27 | 27,000 | 1.02 | 100 | 0.5 | 9 |

TABLE 5-continued

Result of Evaluation of Magnetic Recording Medium

| | Ferromagnetic powder | Compound | | | | Result of evaluation of magnetic recording medium | |
|---|---|---|---|---|---|---|---|
| | | Kind | Weight-average molecular weight | Amine value (mmol/g) | Tg (° C.) | S/N ratio (dB) | Durability (poor) 1 to 10 (good) |
| Example 28 | BaFe | Q-28 | 28,000 | 0.54 | 170 | 0.5 | 10 |
| Example 29 | BaFe | Q-29 | 8,200 | 0.48 | 30 | 1.0 | 7 |
| Example 30 | BaFe | Q-30 (acid modification) | 4,300 | 0.30 | 100 | 1.8 | 10 |
| Example 31 | BaFe | Q-31 (acid modification) | 12,600 | 0.20 | 100 | 1.5 | 10 |
| Example 32 | BaFe | Q-32 (acid modification) | 10,300 | 0.76 | 55 | 1.5 | 9 |
| Example 33 | BaFe | Q-33 (acid modification) | 8,400 | 0.21 | 55 | 1.5 | 9 |
| Comparative Example 1 | BaFe | Comparative compound 1 | 8,400 | 0.21 | 55 | 0 | 1 |
| Comparative Example 2 | BaFe | Comparative compound 2 (Intermediate P-3) | 8,400 | 0.21 | 55 | 0 | 10 |
| Example 34 | SrFe2 | Q-2 | 4,100 | 0.35 | 105 | 1.7 | 9 |
| Example 35 | SrFe2 | Q-3 | 7,300 | 0.28 | 105 | 1.7 | 9 |
| Example 36 | SrFe2 | Q-4 | 12,200 | 0.24 | 105 | 1.2 | 9 |
| Example 37 | SrFe2 | Q-5 | 7,100 | 0.34 | 105 | 1.7 | 9 |
| Example 38 | SrFe2 | Q-6 | 7,900 | 0.36 | 90 | 1.7 | 9 |
| Example 39 | SrFe2 | Q-7 | 16,300 | 0.85 | 90 | 1.2 | 9 |
| Example 40 | SrFe2 | Q-8 | 8,100 | 0.25 | 90 | 1.7 | 9 |
| Example 41 | SrFe2 | Q-14 | 5,400 | 0.49 | 110 | 1.2 | 9 |
| Example 42 | SrFe2 | Q-15 | 5,800 | 0.22 | 100 | 1.7 | 9 |
| Example 43 | SrFe2 | Q-16 | 6,000 | 0.83 | 110 | 1.2 | 9 |
| Example 44 | SrFe2 | Q-17 | 4,800 | 0.33 | 105 | 1.7 | 9 |
| Example 45 | SrFe2 | Q-18 | 3,900 | 0.47 | 100 | 1.7 | 9 |
| Example 46 | SrFe2 | Q-22 | 8,300 | 0.38 | 105 | 1.7 | 9 |
| Example 47 | SrFe2 | Q-23 | 9,300 | 0.82 | 95 | 1.7 | 9 |
| Example 48 | SrFe2 | Q-28 | 28,000 | 0.54 | 170 | 0.7 | 9 |
| Example 49 | SrFe1 | Q-2 | 4,100 | 0.35 | 105 | 1.8 | 9 |
| Example 50 | SrFe1 | Q-3 | 7,300 | 0.28 | 105 | 1.8 | 9 |
| Example 51 | SrFe1 | Q-4 | 12,200 | 0.24 | 105 | 1.2 | 9 |
| Example 52 | SrFe1 | Q-5 | 7,100 | 0.34 | 105 | 1.8 | 9 |
| Example 53 | SrFe1 | Q-6 | 7,900 | 0.36 | 90 | 1.8 | 9 |
| Example 54 | SrFe1 | Q-7 | 16,300 | 0.85 | 90 | 1.2 | 9 |
| Example 55 | SrFe1 | Q-8 | 8,100 | 0.25 | 90 | 1.8 | 9 |
| Example 56 | SrFe1 | Q-14 | 5,400 | 0.49 | 110 | 1.3 | 9 |
| Example 57 | SrFe1 | Q-15 | 5,800 | 0.22 | 100 | 1.8 | 9 |
| Example 58 | SrFe1 | Q-16 | 6,000 | 0.83 | 110 | 1.2 | 9 |
| Example 59 | SrFe1 | Q-17 | 4,800 | 0.33 | 105 | 1.8 | 9 |
| Example 60 | SrFe1 | Q-18 | 3,900 | 0.47 | 100 | 1.7 | 9 |
| Example 61 | SrFe1 | Q-22 | 8,300 | 0.38 | 105 | 1.8 | 9 |
| Example 62 | SrFe1 | Q-23 | 9,300 | 0.82 | 95 | 1.7 | 9 |
| Example 63 | SrFe1 | Q-28 | 28,000 | 0.54 | 170 | 0.7 | 9 |
| Example 64 | ε-iron oxide | Q-2 | 4,100 | 0.35 | 105 | 1.9 | 8 |
| Example 65 | ε-iron oxide | Q-3 | 7,300 | 0.28 | 105 | 1.9 | 8 |
| Example 66 | ε-iron oxide | Q-4 | 12,200 | 0.24 | 105 | 1.4 | 8 |
| Example 67 | ε-iron oxide | Q-5 | 7,100 | 0.34 | 105 | 1.9 | 8 |
| Example 68 | ε-iron oxide | Q-6 | 7,900 | 0.36 | 90 | 1.9 | 8 |
| Example 69 | ε-iron oxide | Q-7 | 16,300 | 0.85 | 90 | 1.4 | 8 |
| Example 70 | ε-iron oxide | Q-8 | 8,100 | 0.25 | 90 | 1.9 | 8 |
| Example 71 | ε-iron oxide | Q-14 | 5,400 | 0.49 | 110 | 1.4 | 8 |
| Example 72 | ε-iron oxide | Q-15 | 5,800 | 0.22 | 100 | 1.9 | 8 |
| Example 73 | ε-iron oxide | Q-16 | 6,000 | 0.83 | 110 | 1.4 | 8 |
| Example 74 | ε-iron oxide | Q-17 | 4,800 | 0.33 | 105 | 1.9 | 8 |
| Example 75 | ε-iron oxide | Q-18 | 3,900 | 0.47 | 100 | 1.9 | 8 |
| Example 76 | ε-iron oxide | Q-22 | 8,300 | 0.38 | 105 | 1.9 | 8 |
| Example 77 | ε-iron oxide | Q-23 | 9,300 | 0.82 | 95 | 1.9 | 8 |
| Example 78 | ε-iron oxide | Q-28 | 28,000 | 0.54 | 170 | 0.9 | 8 |

From the result shown in Table 5, in the magnetic recording media of Examples 1 to 78, it is possible to confirm that both the improvement of electromagnetic conversion characteristics and the improvement of durability are achieved.

One aspect of the invention is effective in a technical field of a magnetic recording medium for high-density recording.

What is claimed is:

1. A magnetic recording medium comprising:
 a non-magnetic support; and
 a magnetic layer including a ferromagnetic powder and a binding agent on the non-magnetic support,
 wherein the magnetic layer further includes a compound including a polyalkyleneimine chain and a vinyl polymer chain.

2. The magnetic recording medium according to claim 1, wherein the compound includes a poly(meth)acrylate chain as the vinyl polymer chain.

3. The magnetic recording medium according to claim 1, wherein the compound includes a polystyrene chain as the vinyl polymer chain.

4. The magnetic recording medium according to claim 1, wherein a glass transition temperature Tg of the compound is 50° C. to 200° C.

5. The magnetic recording medium according to claim 1, wherein an amine value of the compound is equal to or greater than 0.20 mmol/g.

6. The magnetic recording medium according to claim 1, wherein a weight-average molecular weight of the compound is equal to or smaller than 30,000.

7. The magnetic recording medium according to claim 1, wherein the magnetic layer includes 0.5 to 50.0 parts by mass of the compound with respect to 100.0 parts by mass of the ferromagnetic powder.

8. The magnetic recording medium according to claim 1, wherein an average particle size of the ferromagnetic powder is 5 to 50 nm.

9. The magnetic recording medium according to claim 1, wherein the ferromagnetic powder is a hexagonal barium ferrite powder.

10. The magnetic recording medium according to claim 1, wherein the ferromagnetic powder is a hexagonal strontium ferrite powder.

11. The magnetic recording medium according to claim 1, wherein the ferromagnetic powder is an ε-iron oxide powder.

12. A magnetic recording and reproducing device comprising:
 the magnetic recording medium according to claim 1; and
 a magnetic head.

* * * * *